(12) United States Patent
Tenuta

(10) Patent No.: US 9,007,192 B2
(45) Date of Patent: *Apr. 14, 2015

(54) SENSOR PATTERN FOR A TACTILE INPUT DEVICE

(71) Applicant: Google Inc., Mountain View, CA (US)

(72) Inventor: Matthew Dominic Tenuta, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/046,406

(22) Filed: Oct. 4, 2013

(65) Prior Publication Data

US 2014/0098046 A1    Apr. 10, 2014

Related U.S. Application Data

(63) Continuation of application No. 13/709,931, filed on Dec. 10, 2012.

(60) Provisional application No. 61/709,388, filed on Oct. 4, 2012.

(51) Int. Cl.
*G06F 3/01* (2006.01)
*G08B 6/00* (2006.01)
(Continued)

(52) U.S. Cl.
CPC .............. *G06F 3/016* (2013.01); *G06F 3/017* (2013.01); *G06F 3/041* (2013.01); *G08B 6/00* (2013.01); *G06F 3/044* (2013.01); *G06F 2203/04111* (2013.01)

(58) Field of Classification Search
CPC ....... G06F 3/044; G06F 3/0421; G06F 3/042; G06F 3/045; G06F 3/037; G06F 3/0488; G06F 3/0483; G06F 2203/04111

USPC .............. 340/407.2; 73/862.041; 250/231.19; 345/156, 173, 661

See application file for complete search history.

(56) References Cited

U.S. PATENT DOCUMENTS

| 5,305,017 A | 4/1994 | Gerpheide |
| 6,147,680 A | 11/2000 | Tareev |
| 6,297,811 B1 | 10/2001 | Kent et al. |

(Continued)

FOREIGN PATENT DOCUMENTS

| DE | 202012102387 U1 | 7/2012 |
| EP | 2157500 A2 | 2/2010 |
| WO | 2014055742 A1 | 4/2014 |

OTHER PUBLICATIONS

Search Report and Written Opinion for International Application No. PCT/US20131063231, mailed Dec. 4, 2013, 7 pages.

(Continued)

*Primary Examiner* — Brian Zimmerman
*Assistant Examiner* — Bhavin M Patel
(74) *Attorney, Agent, or Firm* — Brake Hughes Bellermann LLP

(57) ABSTRACT

A tactile sensor includes a plurality of first sensing elements that are arranged in a plurality of rows on a first layer and a plurality of second sensing elements that are vertically aligned in a plurality of columns on the first layer. The second sensing elements in each column are electrically connected together and each of the plurality of columns are separate conductors from one another. The plurality of second sensing elements include a plurality of vertical elements that form an interlocking pattern with the plurality of first sensing elements.

12 Claims, 6 Drawing Sheets

(51) Int. Cl.
  *G06F 3/044* (2006.01)
  *G06F 3/041* (2006.01)

(56) References Cited

U.S. PATENT DOCUMENTS

| | | | |
|---|---|---|---|
| 7,030,782 | B2 | 4/2006 | Ely et al. |
| 7,129,935 | B2 | 10/2006 | Mackey |
| 7,202,859 | B1 | 4/2007 | Speck et al. |
| 7,218,124 | B1 | 5/2007 | Mackey et al. |
| 7,382,139 | B2 | 6/2008 | Mackey |
| 7,394,458 | B2 | 7/2008 | Lyon et al. |
| 7,423,635 | B2 | 9/2008 | Taylor et al. |
| 7,463,246 | B2 | 12/2008 | Mackey |
| 7,545,289 | B2 | 6/2009 | Mackey et al. |
| 7,548,073 | B2 | 6/2009 | Mackey et al. |
| 7,737,953 | B2 | 6/2010 | Mackey |
| 7,764,274 | B2 | 7/2010 | Westerman et al. |
| 7,834,862 | B2 | 11/2010 | Liao et al. |
| 8,040,321 | B2 | 10/2011 | Peng et al. |
| 8,069,735 | B1 * | 12/2011 | Egorov et al. ............ 73/862.046 |
| 8,072,429 | B2 | 12/2011 | Grivna |
| 8,121,283 | B2 | 2/2012 | Peng et al. |
| 8,130,203 | B2 | 3/2012 | Westerman |
| 8,159,467 | B2 | 4/2012 | Gray et al. |
| 2007/0057167 | A1 | 3/2007 | MacKey et al. |
| 2007/0229470 | A1 | 10/2007 | Snyder et al. |
| 2009/0166100 | A1 | 7/2009 | Matsubara |
| 2009/0194344 | A1 | 8/2009 | Harley et al. |
| 2009/0206845 | A1 | 8/2009 | Mackey |
| 2009/0273570 | A1 | 11/2009 | Degner et al. |
| 2009/0315570 | A1 | 12/2009 | Chappell et al. |
| 2010/0045614 | A1 | 2/2010 | Gray et al. |
| 2010/0231555 | A1 | 9/2010 | Mackey |
| 2010/0302201 | A1 | 12/2010 | Ritter et al. |
| 2011/0037724 | A1 | 2/2011 | Paulsen et al. |
| 2012/0062497 | A1 | 3/2012 | Rebeschi et al. |
| 2012/0105356 | A1 | 5/2012 | Brosnan et al. |
| 2012/0154332 | A1 * | 6/2012 | Chang et al. .................. 345/174 |
| 2012/0227259 | A1 | 9/2012 | Badaye et al. |
| 2013/0127775 | A1 | 5/2013 | Yilmaz et al. |
| 2014/0097948 | A1 | 4/2014 | Tenuta |

OTHER PUBLICATIONS

Non-Final Office Action for U.S. Appl. No. 13/709,931, mailed Aug. 6, 2014, 36 pages.

* cited by examiner

SENSOR PATTERN FOR A TACTILE INPUT DEVICE

CROSS REFERENCE TO RELATED APPLICATIONS

This application is a Continuation of, and claims priority to, U.S. patent application Ser. No. 13/709,931, filed Dec. 10, 2012, entitled "SENSOR PATTERN FOR A TACTILE INPUT DEVICE", which, in turn, claims priority to U.S. Provisional Application No. 61/709,388, filed Oct. 4, 2012, titled "SENSOR PATTERN FOR A TACTILE INPUT DEVICE," which is hereby incorporated by reference in its entirety.

TECHNICAL FIELD

This description relates to a sensor pattern for a tactile input device.

BACKGROUND

Some computing devices, such as laptop computers, include one or more input devices, such as a mouse, a keyboard, or a touchscreen. Various computing devices include a trackpad or touchpad that can be used in place of or in addition to a mouse to maneuver a curser on a computer screen, or to trigger one or more functions of a computing device. Such trackpads or touchpads can be coupled to, or integrated within, the computing device.

A touchpad (also referred to herein interchangeably as a trackpad) is a pointing device featuring a tactile sensor or sensor, which is a specialized surface that can detect and translate the motion and position of a user's fingers to a relative position on screen. Touchpads are a feature of laptop computers or mobile devices, and are also used as a substitute for a mouse, for example where desk space is scarce. Because they vary in size, they can also be found on personal digital assistants and portable media players. Wired or wireless touchpads are also available as accessories. It is desirable to have a sensor that accurately detects and translates the motion and position of a user's fingers or other touch implement to a relative position on screen.

SUMMARY

According to one general aspect, a tactile sensor includes a plurality of first sensing elements that are arranged in a plurality of rows on a first layer and a plurality of second sensing elements that are vertically aligned in a plurality of columns on the first layer. The second sensing elements in each column are electrically connected together and each of the plurality of columns are separate conductors from one another. The plurality of second sensing elements include a plurality of vertical elements that form an interlocking pattern with the plurality of first sensing elements.

Implementations may include one or more of the following features. For example, the plurality of first sensing elements may include a plurality of vertical elements that form the interlocking pattern with the plurality of vertical elements of the plurality of second sensing elements. The vertical elements from the plurality of the first sensing elements may alternate with the vertical elements from the plurality of the second sensing elements. The plurality of vertical elements from the plurality of first sensing elements may define rectangular-shaped projections that project vertically along a horizontal element. The plurality of first sensing elements and the plurality of second sensing elements may be formed using copper etching. The tactile sensor may include a controller having a plurality of inputs and a plurality of outputs, where the plurality of first sensing elements may be operably coupled to the plurality of inputs of the controller and the plurality of second sensing elements may be operably coupled to the plurality of outputs of the controller. The plurality of second sensing elements may be electrically connected together on a second layer. The second sensing elements may be connected one to the other on the second layer to form a continuous vertical sensing element. The plurality of first sensing elements may be electrically isolated from the plurality of second sensing elements. Each of the plurality of first sensing elements may form a continuous horizontal line and each column of the plurality of second sensing elements may interface along each of the continuous horizontal sensing elements.

In another general aspect, a tactile sensor includes a plurality of first sensing elements that are arranged in a plurality of rows on a first layer and a plurality of second sensing elements that are vertically aligned in a plurality of columns on the first layer. The second sensing elements in each column are electrically connected together and each of the plurality of columns are separate conductors from one another. The plurality of first sensing elements include a plurality of vertical elements that form an interlocking pattern with the plurality of second sensing elements.

Implementations may include one or more of the following features. For example, the plurality of vertical elements from the plurality of first sensing elements may define rectangular-shaped projections that project vertically along a horizontal element. The plurality of first sensing elements and the plurality of second sensing elements may be formed using copper etching. The tactile sensor may include a controller having a plurality of inputs and a plurality of outputs, where the plurality of first sensing elements may be operably coupled to the plurality of inputs of the controller and the plurality of second sensing elements may be operably coupled to the plurality of outputs of the controller. The plurality of second sensing elements may be electrically connected together on a second layer. The plurality of first sensing elements may be electrically isolated from the plurality of second sensing elements.

In another general aspect, a tactile sensor includes a plurality of first sensing elements that are arranged in a plurality of rows on a first layer, where the plurality of first sensing elements include a horizontal segment from which a plurality of vertical elements project. The tactile sensor includes a plurality of second sensing elements that are vertically aligned in a plurality of columns on the first layer, with the second sensing elements in each column being electrically connected together and each of the plurality of columns being separate conductors from one another. The plurality of second sensing elements include a horizontal segment from which a plurality of vertical elements project.

Implementations may include one or more of the following features. For example, the vertical elements from the plurality of the first sensing elements may alternate with the vertical elements from the plurality of the second sensing elements. The horizontal segment of each of the first sensing elements may be disposed on the tactile sensor from a first side of the sensor to a second side of the sensor. The plurality of first sensing elements and the plurality of second sensing elements may be formed using copper etching.

The details of one or more implementations are set forth in the accompanying drawings and the description below. Other features will be apparent from the description and drawings, and from the claims.

DETAILED DESCRIPTION

Figure 1A:
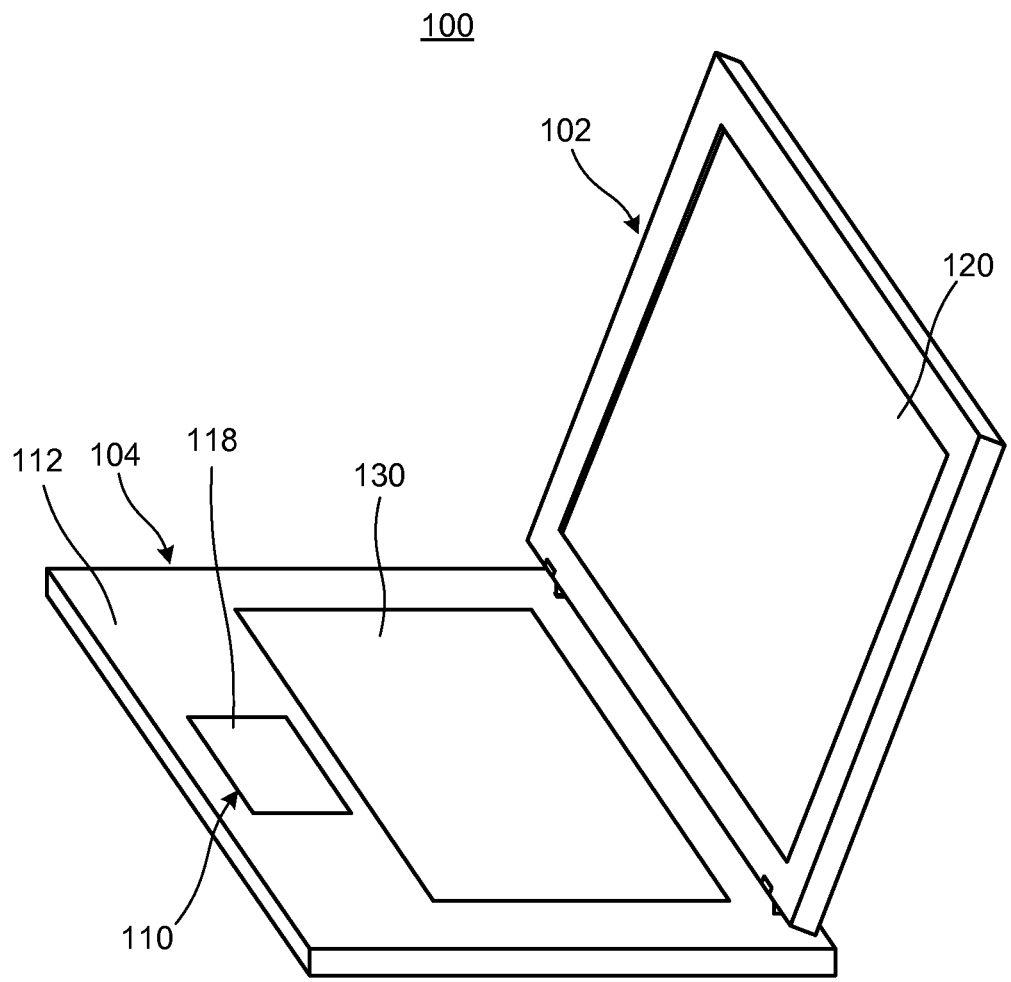
FIG. 1A is an exemplary block diagram of a computing device including a tactile input device according to an exemplary implementation.

A tactile input device for use with a computing device can be used to communicate with and control operations of the computing device. The tactile input device may include, for example, a trackpad or a touch pad. The terms trackpad and touch pad may be used interchangeably throughout this document to mean the same thing. The tactile input device can be configured to be contacted by a user on a top surface of the tactile input device to trigger an electronic signal within the computing device. For example, a user can slide or move one or more fingers, or in some cases, knuckles or a portion of a hand, across the top surface of the tactile input device to move a cursor visible on a display of the computing device. The tactile input device can also include a "scroll" function to allow the user to for example, scroll vertically or horizontally across the display. The scroll function may be equivalent to rolling a wheel on a mouse, or typing "page up" or "page down" buttons on the keyboard. The user may actuate the scroll function by holding both fingers down on the tactile input device, and moving one or both fingers in the horizontal or vertical direction. The tactile input device may respond by recognizing the fingers as a scroll gesture, and provide a scroll gesture output to other components of the computing system.

The tactile input device can also include a "click" function to allow the user to for example, click or select items on the display, or to actuate a right click function. Various tactile input devices described herein can allow a user to actuate a click function by exerting or applying a force on a top surface of the tactile input device at any location on the top surface. In some implementations, the tactile input device may not have a specific sensor location that the user finds to actuate a click function. In other implementations, the tactile input device may include a portion (e.g., a bottom third of a trackpad) that the user may depress (e.g., with a certain amount of pressure) to actuate a click function. The tactile input device can also travel a consistent vertical distance and provide a consistent tactile response to the user when the user clicks on any portion of the top surface of the tactile input device.

The tactile input device may include a sensor component that is used to determine a position of items (a user's fingers or hand, a stylus, etc.) that touch the tactile input device by sensing changes in capacitance levels on the tactile input device and providing resulting signal information to a controller. The sensor may include multiple sensing elements that are arranged in a sensor pattern (or pattern). The sensing elements may be conductors and the terms sensing elements, conductors and conductor segments are used interchangeably throughout this document to mean the same thing. The pattern arrangement of the sensing elements may provide a higher number of interfaces (or gaps or spaces) between the sensing elements, thus providing a greater number of sensitive areas on the tactile input device on which to determine finger positioning. The pattern arrangement of the sensing elements may provide an improved tactile input device that is sensitive over more of the surface area and better able to determine finger placement and positioning.

As used herein, a reference to a top view in a figure refers to a view as viewed by a user during use of the tactile input device. For example, a top view can refer to a view of the tactile input device as disposed within a computing device such that the user can contact the top surface of the tactile input device to initiate an action within the computing device.

FIG. 1A is a diagram of a computing device 100 including a tactile input device 110 according to an exemplary implementation. Computing device 100 includes a display portion 102 and a base portion 104. Display portion 102 may include a display 120 that can be, for example, a liquid crystal display (LCD), a light emitting diode (LED) display, or other type of electronic visual display device. The base portion 104 can include, among other components, a tactile input device 110, a housing 112, and a keyboard portion 130.

The tactile input device 110 can include a sensor (not shown) and a top surface 118, configured to receive inputs (e.g., a touch, swipe, scroll, drag, click, hold, tap, combination of inputs, etc.) from a user. The sensor can be activated when a user enters an input on the top surface 118 of the tactile input device 110, and can communicate electronic signals within the computing device 100. The sensor can be, for example, a flame-retardant class-4 (FR3) printed circuit board. Other components, such as a dome switch, adhesive sheets, and cables (not shown), may also be integrated in computing device 100 to process input by a user via tactile input device 110 or keyboard 130. Various elements shown in the display 120 of the computing device 100 may be updated based on various movements of contacts on the tactile input device 110 or the keyboard 130.

Tactile input devices, such as tactile input device 110, may be used in self-contained portable laptop computers such as device 100, and do not require a flat surface near the computer. The tactile input device 110 may be positioned close to the keyboard 130. The tactile input device 110 may only use very short finger movements to move a cursor across the display 120. While advantageous, this also makes it difficult for a user to move his or her finger(s) across the surface 118 of the tactile input device 110 in a completely horizontal or vertical direction. Tactile input device functionality is also available for desktop computers in keyboards with built-in touchpads, and in mobile devices, as described in more detail below with respect to FIG. 5.

The components of the input devices (e.g., 110, 130) described here can be formed with a variety of different materials such as plastic, metal, glass, ceramic, etc. used for such components. For example, the top surface 118 and base member 104 can each be formed, at least in part, with an insulating material and/or conductive material such as a stainless steel material, for example, SUS301 or SUS304.

Some tactile input devices have "hotspots," which are locations on the tactile input device 110 used for functionality beyond a mouse. Some tactile input device drivers support tap zones, regions where a tap will execute a function, for example, pausing a media player or launching an application. Certain tactile input devices 110 may use two-finger dragging for scrolling. The tactile input devices and associated device driver software may interpret, for example, holding two fingers on the surface 118 of the tactile input device 110, and moving one or both of the fingers in a horizontal or vertical direction, as scrolling. All of these functions may be implemented in tactile input device driver software or firmware, and these functions can be modified or disabled.

In some computing devices, such as computing device 100, the tactile input device 110 may sense any number of fingers (such as up to five, or more) simultaneously, providing more options for input, such as the ability to bring up a menu by tapping two fingers, dragging two fingers for scrolling, or gestures for zoom in or out or rotate. Additionally, although input device 110 is depicted as a rectangle, it will be appreciated that input device 110 could be formed in a different shape, such as a circle, a square, or other shape without departing from the scope of the techniques described here. The functionalities described herein, such as scrolling or zooming, may be interpreted by a gesture library as a single gesture.

Figure 1B:
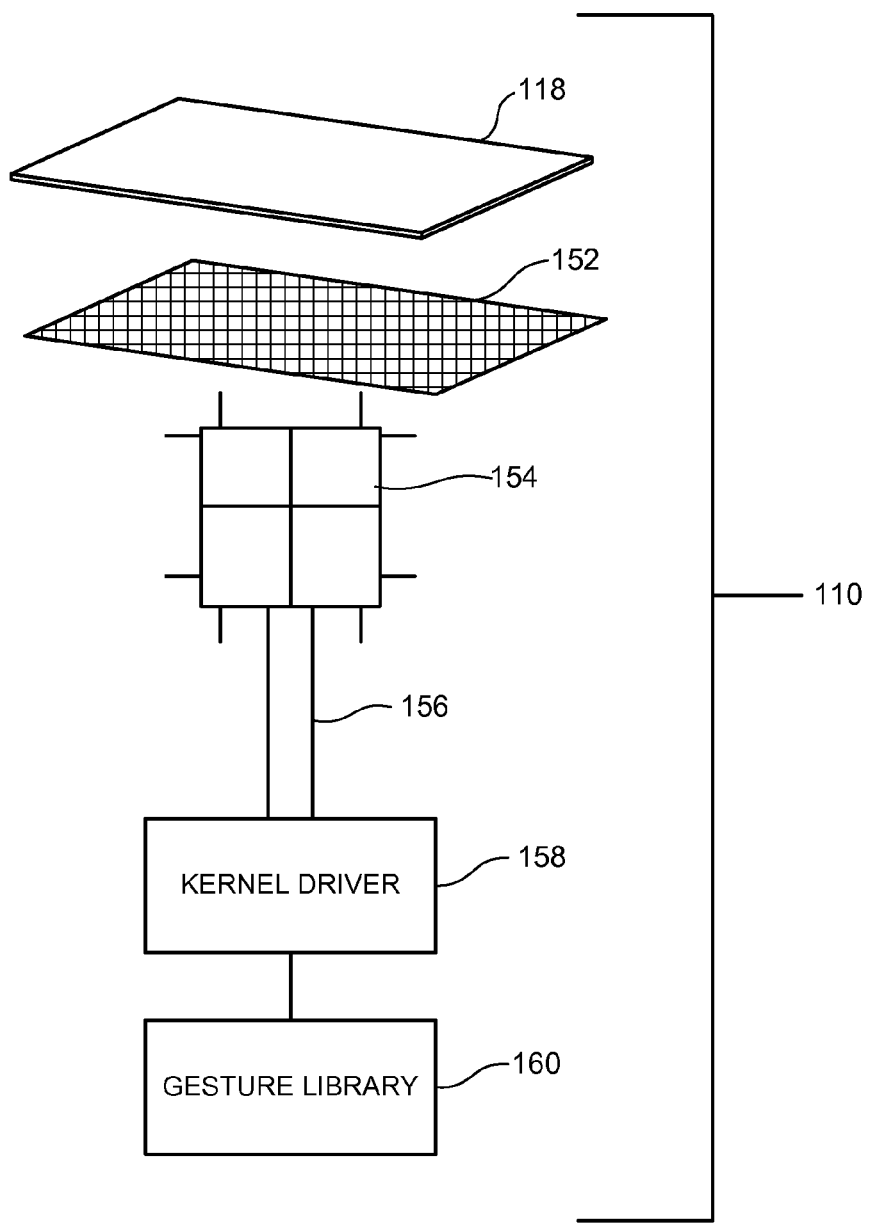
FIG. 1B is an exemplary block diagram of the tactile input device and related components according to an exemplary implementation.

FIG. 1B is a diagram of the tactile input device 110 and related components according to an exemplary implementation. Tactile input device 110 includes the surface 118, a sensor 152, a controller 154, a bus 156, a kernel driver 158, and a gesture library 160.

The surface 118 may be configured to be contacted by a user to actuate and trigger an electrical response within the computing device 100. The surface 118 may, for example, be on top of the tactile input device 110 and above the sensor 152, parallel and flush or nearly flush with other components of the computing device 100 (shown in FIG. 1A), such as a top surface of the housing 112 of the base portion 104. The surface 118 may be operably coupled to the sensor 152. The sensor 152 can be activated when a user enters an input (e.g., a touch, swipe, or a click), such as by applying pressure on the top surface 118 of the tactile input device 110. The sensor 152 can be, for example, a flame-retardant class-4 (FR4) printed circuit board. The sensor 152 may be responsive to applications of pressure on the surface 118 and/or sensor 152, and may provide signals to a controller 154 indicating changes in resistance and/or capacitance in the sensor 152 based on the applications of touch and/or pressure.

The sensor 152 may include one or more layers. Sensing elements may be arranged in a pattern on a top layer of the sensor 152. The sensing elements may be electrically independent from one another and/or one or more of the sensing elements may be electrically coupled to one another on a same layer, on a different layer or on a combination of the same layer and a different layer. The sensor 152 and the pattern arrangement of the sensing elements is described in more detail below with respect to FIGS. 2-4.

Controller 154 may be operably coupled to sensor 152. Controller 154 may be an embedded microcontroller chip and may include, for example, read-only firmware. Controller 154 may include a single integrated circuit containing a processor core, memory, and programmable input/output peripherals. Bus 156 may be a PS/2, I2C, SPI, WSB, or other bus. Bus 156 may be operably coupled to controller 154 and may communicate with kernel driver 158. Kernel driver 158 may include firmware and may also include and/or communicate with gesture library 160. Gesture library 160 may include executable code, data types, functions, and other files (such as JAVASCRIPT files) which may be used to process input to tactile input device 110 (such as multitouch gestures). Gesture library 160, in combination with kernel driver 158, bus 156, controller 154, sensor 152, and surface 118, may be used to implement various processes, such as the processes described herein.

The components of the tactile input device 110, and their interrelationships, as shown and described with respect to FIG. 1B, are merely an example. Functionalities of the gesture library 160 may be performed by the kernel driver 158 and/or controller 154, an operating system or application. The functionalities may, for example, be stored and/or included on a non-transitory computer-readable storage medium comprising instructions stored thereon that, when executed by a processor or the controller 154 of the computing system 100, are configured to cause the computing system 100 to perform any combination of the functionalities or processes described herein. Or, the tactile input device 110 may be designed as an application specific integrated circuit (ASIC) to perform the functions described herein.

Figure 2:
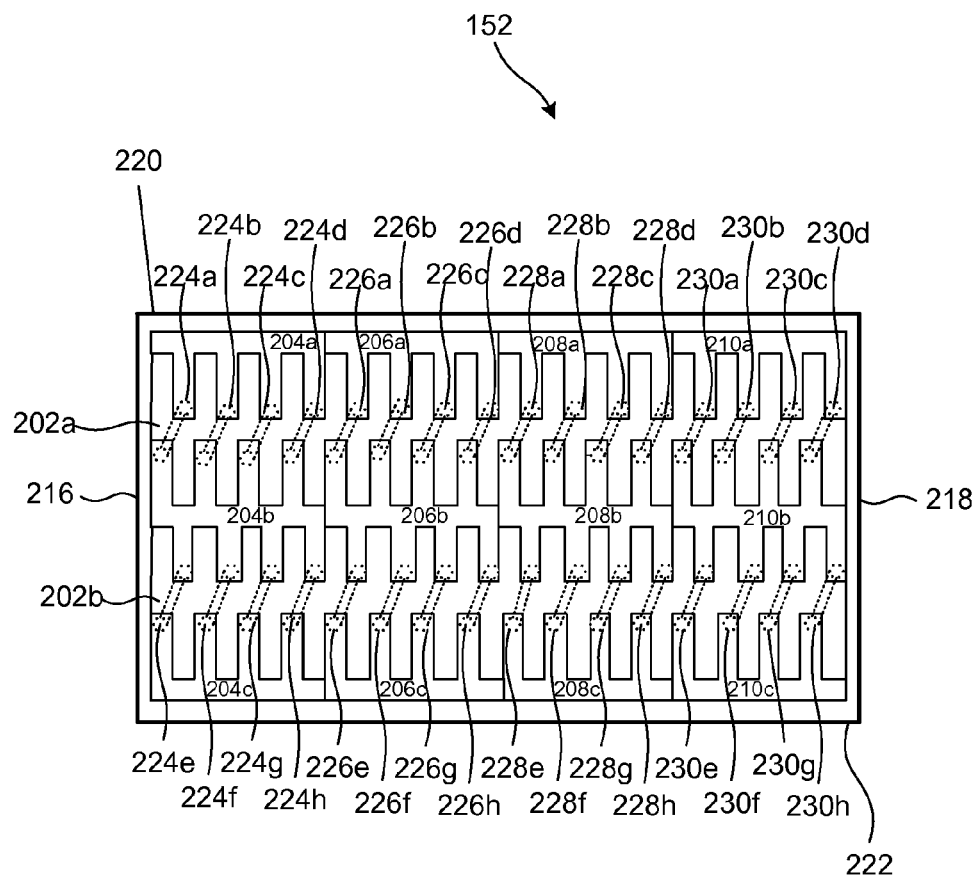
FIG. 2 is an exemplary schematic of a sensor pattern according to an exemplary implementation.

Referring to FIG. 2, an exemplary implementation of the sensor 152 is illustrated. FIG. 2 illustrates multiple sensing elements 202a and 202b that are arranged in rows on a first layer. The sensing elements 202a and 202b are electrical conductors that may extend horizontally from one side 216 of the sensor 152 to the other side 218 of the sensor 152. The sensing elements 202a and 202b may be electrically isolated from one another and not electrically connected to each other on any layer.

Although FIG. 2 illustrates two (2) rows of sensing elements 202a and 202b, the sensor 152 may include more than two rows. It is to be understood that FIG. 2 is merely an illustration of multiple rows of sensing elements and it is not meant to limit the rows of sensing elements to just those illustrated.

The sensing elements 202a and 202b may be implemented using conductive material. In one exemplary implementation, the sensing elements 202a and 202b may be implemented as copper conductors. For example, the sensing elements 202a and 202b may be formed on the sensor 152 using copper etching. A pattern in the shape of the sensing elements 202a and 202b may be formed on the sensor 152 and copper etching may be used to fill in the pattern for the sensing elements 202a and 202b. Other types of conductive materials may be used to form the sensing elements 202a and 202b.

The sensing element 202a may be independent from the sensing element 202b in that the elements are separate from one another. In one exemplary implementation, the sensing elements 202a and 202b may be identical in shape and size. The sensing elements 202a and 202b may aligned with one another or they may be offset, even if the shapes are identical. In other exemplary implementations, the sensing elements 202a and 202b may not be identical in shape and size.

The sensing elements 202a and 202b may include a continuous horizontal element from which multiple vertical elements project on both sides of the horizontal element. Also referring to FIG. 3, an exemplary schematic of the sensing element 202a is illustrated. The sensing element 202a may include the continuous horizontal element 330 from which multiple vertical elements 335a-335n project. The vertical elements 335a-335n project from both sides of the horizontal element 330. In other exemplary implementations, the vertical elements 335a-335n may project from only one side of the horizontal element 330 depending on the placement of the sensing element 202a within the sensor.

Figure 3:
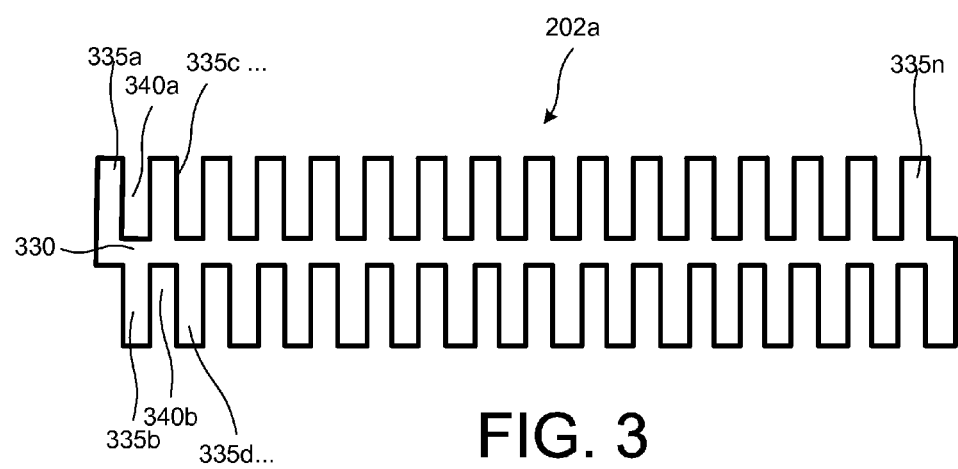
FIG. 3 is an exemplary schematic of a sensing element according to an exemplary implementation.

As illustrated in FIG. 3, the vertical elements 335a-335n may be rectangular-shaped projections. The rectangular-shaped projections also may be referred to as finger-shaped projections. In one exemplary implementation, each of the rectangular-shaped projections may each be the same size (e.g., the same width and the same length). In other exemplary implementations, the rectangular-shaped projections may vary in size.

There may be a space (e.g., 340a, 340b, etc.) between the vertical elements 335a-335n. The space between the vertical elements may be configured to receive correspondingly-shaped projections from other sensing elements (e.g., 204a-204c, 206a-206c, 208a-208c and 210a-210c) in the sensor 152. In this manner, the vertical elements 335a-335n may form an interlocking pattern with the other sensing elements without actually touching the other sensing elements such that there is a gap or an interface between the vertical elements 335a-335n and the other sensing elements.

While FIG. 3 illustrates the vertical elements 335a-335n as rectangular-shaped, it is to be understood that the vertical elements 335a-335n may be other shapes as well. In one exemplary implementation, the vertical elements 335a-335n may be rounded edges such that the vertical elements appear more finger-shaped. Other shapes (e.g., square-shape) are also possible.

Referring back to FIG. 2, the sensor 152 also includes multiple sensing elements 204a-204c, 206a-206c, 208a-208c and 210a-210c that are vertically aligned in columns on the same layer as the sensing elements 202a and 202b. For example, the sensor 152 illustrates four (4) separate columns of vertically aligned sensing elements, where the sensing elements in the same column are electrically connected together. Each column of sensing elements is electrically isolated from the other columns of sensing elements. Each of the columns is arranged from a top 220 of the sensor 152 to the bottom 222 of the sensor 152.

For example, a first column of sensing elements includes the sensing elements 204a, 204b and 204c. The sensing elements 204a, 204b and 204c within the first column are electrically connected together. In one implementation, the sensing elements 204a, 204b and 204c may be electrically connected together on a different layer using the connectors 224a-224h. For instance, the connectors 224a-224h may electrically stitch the sensing elements together on a different layer to form a single, vertically aligned conductive segment. The first column of sensing elements 204a, 204b and 204c are electrically isolated from the other columns of sensing elements and from the sensing elements 202a and 202b.

The second column of sensing elements includes the sensing elements 206a, 206b and 206c. The sensing elements 206a, 206b and 206c within the second column are electrically connected together. In one implementation, the sensing elements 206a, 206b and 206c may be electrically connected together on a different layer using the connectors 226a-226h. For instance, the connectors 226a-226h may electrically stitch the sensing elements together on a different layer to form a single, vertically aligned conductive segment. The second column of sensing elements 206a, 206b and 206c are electrically isolated from the other columns of sensing elements and from the sensing elements 202a and 202b.

The third column of sensing elements includes the sensing elements 208a, 208b and 210c. The sensing elements 208a, 208b and 208c within the third column are electrically connected together. In one implementation, the sensing elements 208a, 208b and 208c may be electrically connected together on a different layer using the connectors 228a-228h. For instance, the connectors 228a-228h may electrically stitch the sensing elements together on a different layer to form a single, vertically aligned conductive segment. The third column of sensing elements 208a, 208b and 208c are electrically isolated from the other columns of sensing elements and from the sensing elements 202a and 202b.

The fourth column of sensing elements includes the sensing elements 210a, 210b and 210c. The sensing elements 210a, 210b and 210c within the fourth column are electrically connected together. In one implementation, the sensing elements 210a, 210b and 210c may be electrically connected together on a different layer using the connectors 230a-230h. For instance, the connectors 230a-230h may electrically stitch the sensing elements together on a different layer to form a single, vertically aligned conductive segment. The fourth column of sensing elements 210a, 210b and 210c are electrically isolated from the other columns of sensing elements and from the sensing elements 202a and 202b.

Although FIG. 2 illustrates four (4) columns of three sensing elements 204a-204c, 206a-206c, 208a-208c and 210a-210c, the sensor 152 may include more than four columns and/or more than three sensing elements in each column. It is to be understood that FIG. 2 is merely an illustration of multiple columns of multiple sensing elements and it is not meant to limit the columns of sensing elements to just those illustrated.

The sensing elements 204a-204c, 206a-206c, 208a-208c and 210a-210c may be implemented using conductive material. In one exemplary implementation, the sensing elements 204a-204c, 206a-206c, 208a-208c and 210a-210c may be implemented as copper conductors. For example, the sensing elements 204a-204c, 206a-206c, 208a-208c and 210a-210c may be formed on the sensor 152 using copper etching. A pattern in the shape of the sensing elements 204a-204c, 206a-206c, 208a-208c and 210a-210c may be formed on the sensor 152 and copper etching may be used to fill in the pattern for the sensing elements 204a-204c, 206a-206c, 208a-208c and 210a-210c. Other types of conductive materials may be used to form the sensing elements 204a-204c, 206a-206c, 208a-208c and 210a-210c. The conductive material used in the sensing elements 204a-204c, 206a-206c, 208a-208c and 210a-210c may be the same conductive material used in the sensing elements 202a and 202b.

The sensing elements 204a-204c, 206a-206c, 208a-208c and 210a-210c may include a horizontal element with multiple vertical elements projecting from the horizontal element, where the projecting vertical elements form an interlocking pattern with the sensing elements 202a and 202b. Also referring to FIG. 4, an exemplary schematic of the sensing element 204a is illustrated. The sensing element 204a may include a horizontal element 440 from which multiple vertical elements 445a-445d project. In the example of sensing element 204a, the vertical elements 445a-445d project from one side of the horizontal element 440. In other vertically aligned sensing elements, such as, for example sensing element 204b, the vertical elements may project from both sides of the horizontal element.

In some implementations, the sensing elements may be flipped or rotated to fit within the sensor and the pattern with the other sensing elements. For example, sensing element 204c is the same shape as the sensing element 204a, but it has been rotated and flipped to fit within the pattern of sensing elements.

Figure 4:
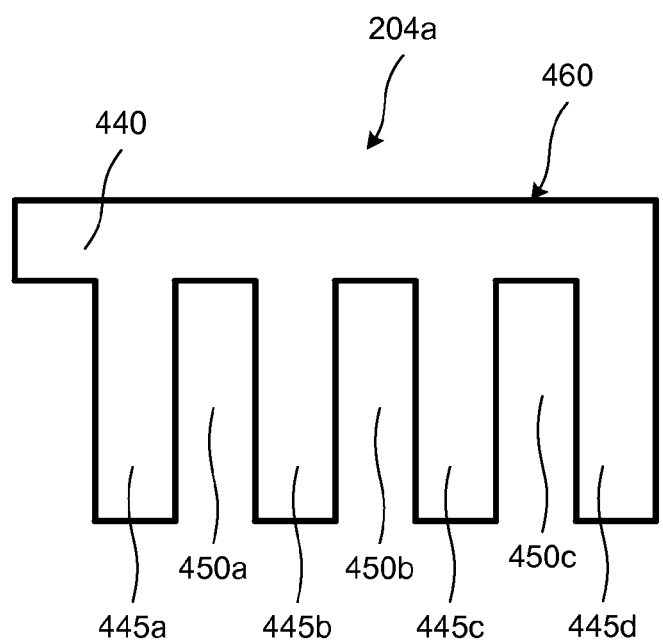
FIG. 4 is an exemplary schematic of a sensing element according to an exemplary implementation.

As illustrated in FIG. 4, the vertical elements 445a-445d may be rectangular-shaped projections. The rectangular-shaped projections also may be referred to as finger-shaped projections. In one exemplary implementation, each of the rectangular-shaped projections may each be the same size (e.g., the same width and the same length). In other exemplary implementations, the rectangular-shaped projections may vary in size.

There may be a space 450a-450c between the vertical elements 445a-445d. The space 450a-450c between the vertical elements may be configured to receive correspondingly-shaped projections from other sensing elements (e.g., 202a and 202b) in the sensor 152. In this manner, the vertical elements 445a-445d may form an interlocking pattern with the other sensing elements (e.g., 202a and 202b) without actually touching the other sensing elements such that there is a gap or an interface between the vertical elements 445a-445d and the other sensing elements 202a and 202b.

While FIG. 4 illustrates the vertical elements 445a-445d as rectangular-shaped, it is to be understood that the vertical elements 445a-445d may be other shapes as well. In one exemplary implementation, the vertical elements 445a-445d may be rounded edges such that the vertical elements appear more finger-shaped. Other shapes (e.g., square-shape) are also possible.

Referring back to FIG. 2, the area between the sensing elements may form a gap or an interface such that a capacitive coupling is formed between the sensing elements. At any point where one of the horizontal sensing elements 202a and 202b interface with a vertically aligned sensing element 204a-204c, 206a-206c, 208a-208c and 210a-210c, a capacitive coupling may be formed. The sensor 152 is sensitive to any changes in coupling along the interface between the sensing elements. In this manner, the coupling occurs in the area between the sensing elements and the gaps between the sensing elements form the sensitive area, where the sensor 152 may detect a user's fingers.

The pattern formed by the sensing elements 202a and 202b and the sensing elements 204a-204c, 206a-206c, 208a-208c and 210a-210c creates a large number of interfaces (i.e., a large area of interfaces), thus creating a large number of sensitive areas. The pattern formed enables a large surface area or a large cumulative length of the sensitive interface. Referring to FIGS. 3 and 4, the lines 360 and 460, respectively, that form the outline of the sensing elements 202a and 204a, represent a gap or interface with other sensing elements when positioned in the sensor 152. The gap or interface may be about 0.2 mm. Other gap distances may be used depending on the positioning of the sensing elements in the sensor 152.

In one exemplary implementation, the sensing elements 202a and 202b may be electrically coupled to an input side (or sense side) of the controller 154 of FIG. 1B. The sensing elements 204a-204c, 206a-206c, 208a-208c and 210a-210c may be electrically coupled to an output side (or drive side) of the controller 154 of FIG. 1B.

In operation, firmware on the controller 154 instructs the controller 154 to output a signal on one of the columns of sensing elements (e.g., 204a-204c, 206a-206c, 208a-208c or 210a-210c). When the output is being driven, the controller 154 samples all of the sensing elements 202a and 202b tied to the input of the controller 154. The controller may sample the sensing elements 202a and 202b in sequence or in a pattern. After driving one column of sensing elements and sampling the rows of sensing elements, the controller 154 activates and drives the another column of sensing elements and samples each of the rows of sensing elements. The controller 154 repeats this process with each column of sensing elements by activating and driving one column of sensing elements at a time and sampling each of the rows of sensing elements.

When the controller 154 samples the sensing elements 202a and 202b, it measures a value and compares the measured value to a known baseline value. The baseline value may be measured at power up of the trackpad. A difference between the measured value and the baseline value at a particular location may be the result of some parasitic capacitance at that location. In this manner, the capacitive coupling at the interface between one of the sensing elements in a column and one of the sensing elements in a row changes in value over the baseline value when a finger is placed on the trackpad at that location.

Based on the location at an interface of where the difference in capacitance occurs, the firmware in the controller 154 can determine an X-Y position and cause an appropriate action to occur such as, for example, cursor movement on a display. A centroiding algorithm may take the signals from the entire sensor 152, group the measurements from different sensing elements that are close to one another and then group them into a circle or an ellipse that represents the area of contact on the trackpad.

The sensor pattern, including the shape and layout of the sensing elements and the interfaces between the sensing elements, provides an improved output signal to the controller 154 to enable the firmware on the controller 154 to better differentiate between fingers placed on the trackpad. The sensor pattern also reduces and/or eliminates loop back effects (or re-radiation effect), where a charge is coupled from the sensor into the user's body and back into the sensor, which may cause areas of weak signals on the sensor and/or problems with the centroiding algorithm. The capacitive coupling occurs along the interfaces between the sensing elements and does not couple back into the user to cause a loop back effect. The sensor pattern is arranged to maximize the amount of sensitive area on the trackpad and to minimize the amount of deadspace in the sensing elements, where the sensor is not effective.

Figure 5:
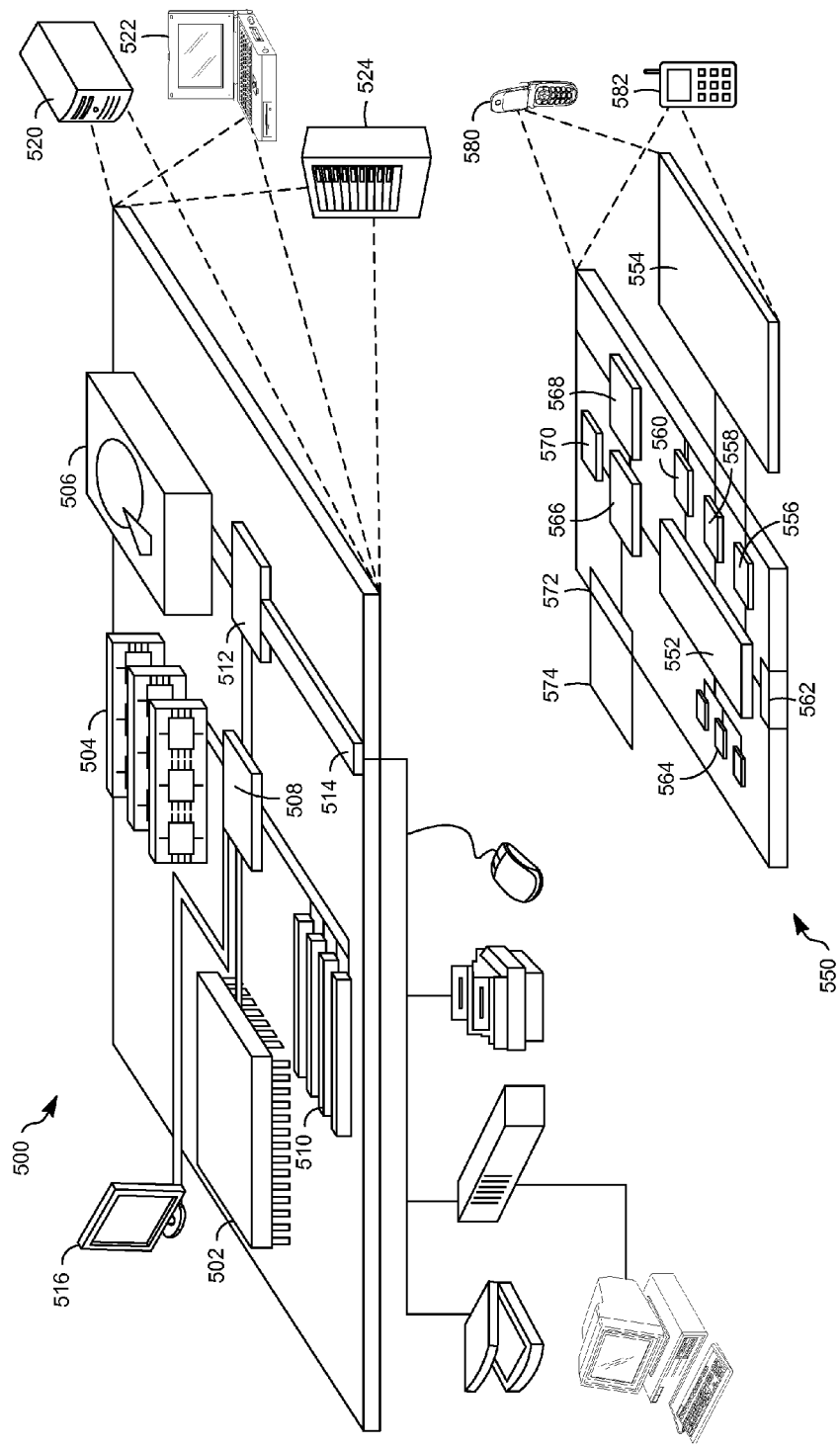
FIG. 5 is a diagram showing example or representative computing devices and associated elements that may be used to implement the systems and methods of FIGS. 1-4.

FIG. 5 is a block diagram showing example or representative computing devices and associated elements that may be used to implement the systems and methods of FIGS. 1-4. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in FIG. 5. For example, it may be implemented as a cellular telephone 580. It may also be implemented as part of a smart phone 582, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A tactile sensor comprising:
   a plurality of first sensing elements that are arranged in a plurality of rows on a first layer; and
   a plurality of second sensing elements that are vertically aligned in a plurality of columns on the first layer, with each of the second sensing elements in each column including multiple vertical elements that define rectangular-shaped projections that project vertically from horizontal elements, wherein each of the second sensing elements arranged in a column are electrically connected together and each of the plurality of columns of second sensing elements are arranged next to one another and are separate conductors from one another, wherein:
      the plurality of first sensing elements each comprise a plurality of vertical elements that define rectangular-shaped projections that project vertically from horizontal elements;
      at least a portion of the rectangular-shaped projections on both the first sensing elements and the second sensing elements are arranged in an alternating and offset pattern from both sides of the horizontal elements; and
      the vertical elements of the first sensing elements form an interlocking pattern with the vertical elements of the second sensing elements.

2. The tactile sensor of claim 1 wherein the plurality of first sensing elements and the plurality of second sensing elements are formed using copper etching.

3. The tactile sensor of claim 1 wherein the plurality of first sensing elements are electrically isolated from the plurality of second sensing elements.

4. The tactile sensor of claim 1 wherein each of the plurality of first sensing elements forms a continuous horizontal line and each column of the plurality of second sensing elements interfaces along each of the continuous horizontal sensing elements.

5. A computing device comprising:
   at least one memory;
   at least one processor; and
   a tactile sensor, wherein the tactile sensor comprises:
   a plurality of first sensing elements that are arranged in a plurality of rows on a first layer; and
   a plurality of second sensing elements that are vertically aligned in a plurality of columns on the first layer, with each of the second sensing elements in each column including multiple vertical elements that define rectangular-shaped projections that project vertically from horizontal elements, wherein each of the second sensing elements arranged in a column are electrically connected together and each of the plurality of columns of second sensing elements are arranged next to one another and are separate conductors from one another, wherein:

the plurality of first sensing elements each comprise a plurality of vertical elements that define rectangular-shaped projections that project vertically from horizontal elements;

at least a portion of the rectangular-shaped projections on both the first sensing elements and the second sensing elements are arranged in an alternating and offset pattern from both sides of the horizontal elements; and the vertical elements of the first sensing elements form an interlocking pattern with the vertical elements of the second sensing elements.

6. The computing device of claim 5 wherein each of the plurality of first sensing elements forms a continuous horizontal line and each column of the plurality of second sensing elements interfaces along each of the continuous horizontal sensing elements.

7. The computing device of claim 5 wherein the plurality of first sensing elements and the plurality of second sensing elements are formed using copper etching.

8. The computing device of claim 5 wherein the plurality of first sensing elements are electrically isolated from the plurality of second sensing elements.

9. A tactile sensor comprising:
a plurality of first sensing elements that are arranged in a plurality of rows on a first layer; and
a plurality of second sensing elements that are vertically aligned in a plurality of columns on the first layer, with each of the second sensing elements in each column including multiple vertical elements that define square-shaped projections that project vertically from horizontal elements, wherein each of the second sensing elements arranged in a column are electrically connected together and each of the plurality of columns of second sensing elements are arranged next to one another and are separate conductors from one another, wherein:

the plurality of first sensing elements each comprise a plurality of vertical elements that define square-shaped projections that project vertically from horizontal elements;

at least a portion of the square-shaped projections on both the first sensing elements and the second sensing elements are arranged in an alternating and offset pattern from both sides of the horizontal elements; and the vertical elements of the first sensing elements form an interlocking pattern with the vertical elements of the second sensing elements.

10. The tactile sensor of claim 9 wherein the plurality of first sensing elements and the plurality of second sensing elements are formed using copper etching.

11. The tactile sensor of claim 9 wherein the plurality of first sensing elements are electrically isolated from the plurality of second sensing elements.

12. The tactile sensor of claim 9 wherein each of the plurality of first sensing elements forms a continuous horizontal line and each column of the plurality of second sensing elements interfaces along each of the continuous horizontal sensing elements.

* * * * *